Patented Feb. 8, 1949

2,461,119

UNITED STATES PATENT OFFICE 2,461,119

BIS-GLYCOLIC ACID AMIDES OF 2,6-DI-AMINO-PYRIDINES AND METHOD OF PREPARING THEM

William A. Lott, Maplewood, and Jack Bernstein and Barbara Stearns, New Brunswick, N. J., assignors to E. R. Squibb & Sons, New York, N. Y., a corporation of New York No Drawing. Application July 31, 1943, Serial No. 496,944

6 Claims. (Cl. 260—295)

This invention relates to, and has for its object the provision of: (A) oxy-carboxylic acid amides of diamino-pyridines; (B) acid-addition salts thereof; and (C) methods of preparing (A) and (B). Certain of compounds (A) and (B) are valuable chemotherapeutic agents, being especially promising as antimalarials.

The invention comprises especially compounds of the general Formulae I

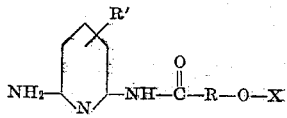

and II

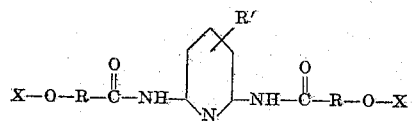

wherein R represents alkylene or arylene, R' represents hydrogen, alkyl or alkoxy, and X represents hydrogen, alkyl, aryl or acyl.

The oxy-carboxylic acid amides of diamino-pyridines may be obtained by reacting the corresponding diamino-pyridine with the corresponding oxy-carboxylic acid, or a lower alkyl ester or (acid) halide thereof, under amide-forming conditions. Thus, these compounds may be obtained by reacting a diamino-pyridine with an acyloxy-carboxylic acid halide in a suitable solvent, especially dioxane, or by fusing a diamino-pyridine with the oxy-carboxylic acid per se. By suitable variation of the proportions of the reactants, one can obtain either a mono-amide (I) or bisamide (II). Alternatively, the mono-amides (I) may be obtained by reacting the corresponding halo-amino-pyridine with the corresponding oxy-carboxylic acid—or a lower alkyl ester or (acid) halide thereof—and replacing the halo group with an amino group.

The oxy-carboxylic acid amides of diamino-pyridines may be converted into acid-addition salts with hydrochloric, sulfuric, and other acids commonly used to solubilize amine bases.

The following examples are illustrative of the invention:

Example 1

A solution of 60 g. acetyl-salicylyl chloride in 150 cc. dioxane is added dropwise to a cooled solution of 66 g. 2,6-diamino-pyridine in 500 cc. dioxane, and the reaction mixture is stirred for an additional hour. The precipitate which forms is filtered off and discarded. The filtrate is concentrated under reduced pressure until the dioxane is removed; and the residue, an oil, is dissolved in 500 cc. normal hydrochloric acid and reprecipitated by adding an equivalent amount of dilute sodium hydroxide. The precipitate thus obtained is recrystallized from a mixture of benzene and absolute alcohol. The product, 2-amino-6-salicylamido-pyridine, is a white solid melting at 178–179° C.

Example 2

(a) A solution of 55.3 g. acetyl-mandelyl chloride in 50 cc. dioxane is added over a period of 15 minutes, while stirring and maintaining the temperature below 30° C., to a solution of 60.2 g. 2,6-diamino-pyridine in 350 cc. dioxane. The stirring is continued for an hour, and the precipitated 2,6-diamino-pyridine mono-hydrochloride is filtered off. The filtrate is concentrated until no more dioxane distills off; and the residue is extracted with ether, and the ether extract is concentrated on the steam bath. The residue, 2-amino-6-(acetyl-mandelamido)-pyridine, is a sticky substance at room temperature.

(b) The product is converted to its hydrochloride by addition of 5% hydrochloric acid; the mono-hydrochloride monohydrate thus obtained being a light-colored crystalline substance which, when recrystallized from alcohol, melts at 151–153° C., and on drying in vacuo to constant weight, melts at 159–161° C.

(c) The product (a) is converted to the corresponding unacetylated compound as follows: 50 g. 2-amino-6-(acetyl-mandelamido)-pyridine is refluxed for one hour with 175 cc. normal sodium hydroxide solution, and the resulting solution is cooled and made just alkaline to Congo with dilute hydrochloric acid. The precipitate, 2-amino-6-mandelamido-pyridine, is filtered off, dried in vacuum, and recrystallized from alcohol.

Example 3

27.8 g. 2,6-diamino-pyridine and 42 g. glycolic acid are fused together at 120° C. under vacuum, until the mass solidifies. Water is then added, and the insoluble product, 2,6-bis(glycolamido)-pyridine, is filtered off and recrystallized from water. It is a white crystalline material melting between 210 and 215° C. (depending on the rate at which the melting point is taken).

Example 4

(a) 80 g. 4-methyl-pyridine is mixed with 160 g. dimethylaniline and 144 g. sodamide, and heated about 10 hours at 130–150° C., followed by about 6 hours at 170–200° C. at the end of which time the hydrogen evolution is usually complete. The mixture is then cooled; the dimethyl aniline is decanted off, and the residual solid is decomposed with water, a mixture of solid and alkaline solution being obtained. This solution is extracted with isopropanol; and the isopropanol solution is dried, and then concentrated under reduced pressure to remove all solvent. The residual dark syrup thus obtained is treated with chloroform until only a small amount of tar remains undissolved, and filtered; and the filtrate is concentrated and cooled. From this solution 2,6-diamino-4-methyl pyridine separates out in crystalline form. After recrystallization from ether it melts at 100° C.

b( 12.3 g. 2,6-diamino-4-methyl pyridine and 15.2 g. glycolic acid are fused together at 120° C. under vacuum, until the mass solidifies. Water is added; and the insoluble product, 2,6-bis(glycolamido)-4-methyl pyridine, is filtered off and recrystallized from 50% alcohol.

*Example 5*

By substituting the same quantity of 3-methyl-pyridine for the 4-methyl-pyridine in the procedure of Example 4 (a), the compound 2,6-diamino-3-methyl-pyridine is obtained; and by reacting this compound with glycolic acid as described in Example 4(b), 2,6-bis(glycolamido)-3-methyl-pyridine is obtained.

*Example 6*

(a) 12.8 g. 3-methoxy-pyridine is dissolved in 40 cc. concentrated sulfuric acid at 0° C., and 5 cc. fuming nitric acid (d. 1.6) is added with vigorous stirring and cooling. An additional 40 cc. concentrated sulfuric acid is then added, and the reaction mixture is heated for six hours on a steam bath. The solution, after cooling, is poured into 500 g. crushed ice and water; and the precipitate, 2,6-dinitro-3-methoxy-pyridine, is filtered off, washed with water, sodium bicarbonate solution, and water, and then dried. On recrystallization from absolute alcohol, it melts at 113–114° C.

1.99 g. 2,6-dinitro-3-methoxy-pyridine is dissolved in 70 cc. glacial acetic acid and 30 cc. acetic anhydride, 0.1 g. platinum oxide catalyst is added, and the reaction mixture is shaken with hydrogen at atmospheric pressure, until the theoretical amount of hydrogen is absorbed (four hours). The reaction mixture is then filtered, and the acetic anhydride and acetic acid distilled off under reduced pressure. The residue is poured into 100 g. ice and water, which is then saturated with potassium carbonate; and the precipitate, 2,6-diacetylamino-3-methoxy-pyridine, is filtered off. On purification by recrystallizing the crude material from water, and then from a mixture of benzene and chloroform, it melts at 173.5–174.5° C.

2 g. 2,6-diacetylamino-3-methoxy-pyridine is boiled with 50 cc. one-normal sodium hydroxide solution (in the presence of hydrogen sulfide) for one hour; and the cooled solution is neutralized with acetic acid, and evaporated to dryness under reduced pressure. The residue, crude 2,6-diamino-3-methoxy-pyridine, is recrystallized from benzene.

Alternatively, the 2,6-diacetylamino-3-methoxy-pyridine (2 g.) is boiled with 20 cc. of 10% hydrochloric acid (saturated with hydrogen sulfide) for a half hour; and the reaction mixture is cooled and evaporated to dryness under reduced pressure. The residue, 2,6-diamino-3-methoxy-pyridine hydrochloride, is dissolved in warm water, a small amount of sodium bisulfite is added as an antioxidant, and the solution is made strongly alkaline with potassium carbonate. Crude 2,6-diamino-3-methoxy-pyridine separates out, and is extracted with ether; the ether extract is dried, and concentrated under reduced pressure; and the residue is recrystallized from benzene.

(b) 13.9 g. 2,6-diamino-3-methoxy-pyridine and 15.2 (2 mols) glycolic acid are fused together at 120° C. under vacuum (with stream of hydrogen sulfide), until the mass solidifies. Water is then added, and the insoluble product, 2,6-bis(glycolamido)-3-methoxy-pyridine, is filtered off, and recrystallized from 50% alcohol.

*Example 7*

(a) 17.3 g. 2-bromo-6-aminopyridine and 7.6 g. glycolic acid are fused at 120° C. for 15 hours under reduced pressure; and the solid mass, 2-bromo-6-glycolamido-pyridine, is ground with water, filtered and recrystallized from absolute alcohol.

(b) 11.6 g. 2-bromo-6-glycolamido-pyridine is heated with 50 cc. aqueous ammonia (d. 0.90) for 20 hours at 190–200° C. in a sealed tube; and the resulting solution is concentrated to 25 cc., treated with activated charcoal, filtered and cooled. On standing, crystals of 2-amino-6-glycolamido-pyridine are formed; and the product is recrystallized from 50% alcohol.

Manifestly, a large number and variety of other oxycarboxylic acid amides of diamino-pyridines and acid-addition salts thereof may be obtained by the procedure of the foregoing examples, using the appropriate reactants. The following additional compounds, inter alia, are thus obtainable:

2-amino-6-lactamido-pyridine
2,6-bis(lactamido)-pyridine
2-amino-6-(α-hydroxy-butyramido)-pyridine
2,6-bis(ethoxy-acetamido)-pyridine Among other reactants utilizable in the procedure of the foregoing examples for the preparation of the compounds of this invention are:

*Oxy-carboxylic acid reactants*

Phenoxy-acetic acid chloride
Lactic acid
α-Hydroxy-butyric acid
α-Hydroxy-caproic acid
α-Hydroxy-valeric acid
Acetonic acid
Saccharic acid
Ascorbic acid
p-Acetoxy-phenylacetyl chloride

*Diamino-pyridine reactants*

2,6-diamino-3-nitro-pyridine
2,6-diamino-3,5-diethoxy-pyridine
2,6-diamino-4-bromo-pyridine
2,3-diamino-pyridine
2,5-diamino-pyridine
3,4-diamino-pyridine
3,5-diamino-pyridine The invention is not to be construed as in any sense restricted to the foregoing specific examples, compounds, reactants, or procedures, but may be variously otherwise embodied within the scope of the appended claims.

We claim:
1. A compound of the general formula

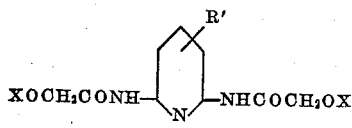

wherein R' represents a member of the group consisting of hydrogen, alkyl, and alkoxy, and X represents a member of the group consisting of hydrogen, alkyl, aryl and acyl radicals.

2. A compound of the general formula

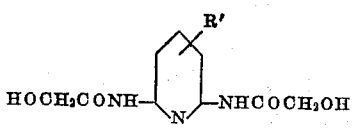

wherein R' represents a member of the group consisting of hydrogen, alkyl, and alkoxy.

3. 2,6-bis(glycolamido)-pyridine.
4. 2,6-bis(glycolamido)-4-methyl-pyridine.
5. 2,6-bis(glycolamido)-3-methoxy-pyridine.
6. The method of preparing a compound of the general formula

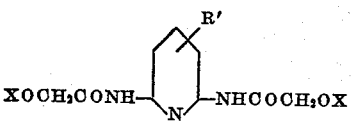

wherein R' represents a member of the group consisting of hydrogen, alkyl, and alkoxy, and X represents a member of the group consisting of hydrogen, alkyl, aryl, and acyl radicals, which comprises fusing under vacuum glycolic acid and a compound of the general formula

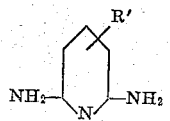

wherein R' has the meaning given hereinbefore.

WILLIAM A. LOTT.
JACK BERNSTEIN.
BARBARA STEARNS.

REFERENCES CITED

The following references are of record in the file of this patent:

UNITED STATES PATENTS

| Number | Name | Date |
| --- | --- | --- |
| 1,830,301 | Tisza | Nov. 3, 1931 |
| 1,979,351 | Schneiderwirth | Nov. 6, 1934 |
| 2,043,547 | Krassny | June 9, 1936 |
| 2,080,517 | Tisza | May 18, 1937 |
| 2,187,847 | Andersag | Jan. 23, 1940 |
| 2,262,357 | De Groote | Nov. 11, 1941 |

OTHER REFERENCES

Chem. Abstracts, vol. 33, p. 8923 (1939).